United States Patent
Jaun

[11] Patent Number: 5,197,514
[45] Date of Patent: Mar. 30, 1993

[54] FLOW DISTRIBUTOR

[75] Inventor: Hans Jaun, La Conversion, Switzerland

[73] Assignee: Nokia-Maillefer, Ecublens, Switzerland

[21] Appl. No.: 676,339

[22] Filed: Mar. 28, 1991

[30] Foreign Application Priority Data

Apr. 3, 1990 [CH] Switzerland ............... 1118/90

[51] Int. Cl.⁵ .................... F16K 3/10; F16K 11/074
[52] U.S. Cl. .................... 137/597; 137/625.46; 251/175; 251/176; 251/180
[58] Field of Search .............. 251/176, 180, 175; 137/625.46, 625.18, 597

[56] References Cited

U.S. PATENT DOCUMENTS

| | | | |
|---|---|---|---|
| 1,176,253 | 3/1946 | Schutt | 251/180 X |
| 2,893,430 | 7/1959 | Holl | |
| 3,203,249 | 8/1965 | Jentzsch | 251/180 X |
| 4,431,161 | 2/1984 | Miller et al. | |
| 4,832,960 | 5/1989 | Compagon | |

FOREIGN PATENT DOCUMENTS

| | | |
|---|---|---|
| 0081910 | 6/1983 | European Pat. Off. |
| 221231 | 5/1987 | European Pat. Off. |
| 2921943 | 12/1980 | Fed. Rep. of Germany |
| 3502847 | 7/1986 | Fed. Rep. of Germany |
| 8810965 | 11/1988 | Fed. Rep. of Germany |
| 1277313 | 10/1961 | France |
| 8808084 | 10/1988 | PCT Int'l Appl. |

Primary Examiner—Arnold Rosenthal
Attorney, Agent, or Firm—Oliff & Berridge

[57] ABSTRACT

A distributor body comprises in its contact surface connection grooves which can communicate in different ways, according to the angular position of the body, with intake and outlet conduits. Rotation of the body is controlled by a motor. A stack of elastic washers acting upon a pusher ensures a suitable pressure of the contact surface against a homologous contact surface.

15 Claims, 4 Drawing Sheets

FLOW DISTRIBUTOR

BACKGROUND OF THE INVENTION

This invention relates to extrusion equipment, and more particularly to a distributor of the flow of fluid materials under high pressure and at high temperature, especially of the flow of molten plastic material, in an extrusion installation, of the type including a distributor cylinder having a geometrical axis and traversed by at least one intake duct and one outlet duct, a distributor body lodged in the cylinder, at least one distribution duct contrived in the distributor body, and connecting an intake duct and an outlet duct in one position of the body, and drive means for causing the distributor body to rotate about the mentioned axis.

French Patent No. 1,277,313, U.S. Pat. No. 4,832,960, and German Patent No. 2,921,943 are examples of disclosures relating to the use of flow distributors attached to extrusion installations in the prior art. These patents show particularly that in the production of insulated electric wire or cable by extrusion of a sheath of plastic material onto a conductor, it is often desired to be able to modify the structure of the insulation rapidly without disturbing the operation of the line.

However, it is difficult to ensure the reliability of the prior art distributors since they must operate at high temperature and since the pressure of the molten plastic material often attains high values. Thus, pressures on the order of 1,100 bars are used in installations of this kind at the present time.

SUMMARY OF THE INVENTION

The object of the present invention is to provide an improved flow distributor of simple design, the reliability of which, in the intended application, is better than that of prior art distributors.

To this end, in the flow distributor according to the present invention, of the type initially mentioned, the cylinder comprises a bottom having an inside surface in which the intake and outlet ducts open out, the distributor body having a frontal face in contact with the aforementioned inside surface, and pressure means rotatingly movable with the distributor body pressing the latter against the bottom of the cylinder counter to the pressure of the fluid materials.

According to another aspect of the invention, the cylinder of the distributor comprises a bottom having at least two intake ducts and two outlet ducts traversing it axially, and the distributor body comprises at least two distribution ducts, each capable of causing an intake mouth of the cylinder to communicate with an outlet mouth, the configuration of these ducts being such that the connections established between the intake and outlet mouths are different according to the angular position of the distributor body relative to the cylinder, and do not traverse the body of the distributor.

Fluid distributors in which intake and outlet ducts pass through the bottom of the cylinder, and the distributor body is pressed against the bottom of the cylinder by a spring, have been described, e.g., in German Utility Model No. 8,810,965. However, they are not intended for applications such as the distribution of molten plastic materials under high pressure.

BRIEF DESCRIPTION OF THE DRAWINGS

A preferred embodiment of the invention will now be described in detail with reference to the accompanying drawings, in which.

DETAILED DESCRIPTION OF PREFERRED EMBODIMENT

Figure 1:
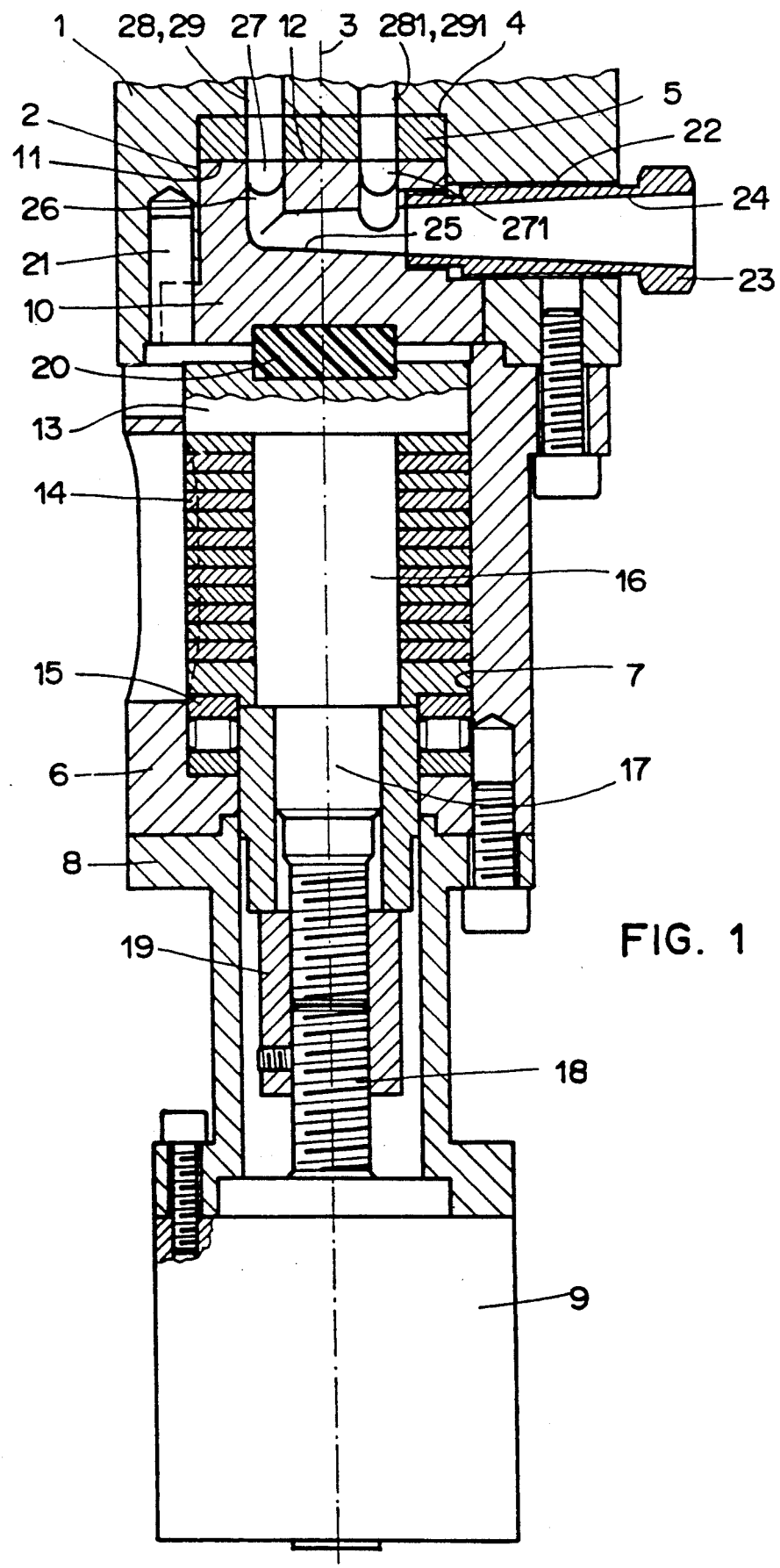
FIG. 1 is an axial sectional view of the distributor.

The distributor shown in FIG. 1 comprises a cylinder 1 in which is contrived a cylindrical recess 2 having an axis 3. This cylindrical recess 2 comprises a flat bottom 4 against which there lies a disk 5 fixed rigidly to the cylinder and composed of a wear-resistant material. The face of the disk 5, turned toward the recess 2, is likewise plane and circular.

On the side opposite the wear disk 5, the cylinder 1 is fixed on a cylinder head 6 which surrounds a cylindrical recess designated as 7 and extending in the continuation of the recess 2. Finally, a likewise cylindrical base 8 is fixed to the cylinder head 6 and bears the stator of a motor 9, the function of which will be described below.

The recess 2 is occupied by a distributor body 10 which has a plane frontal surface 11, turned toward the corresponding face 12 of the wear plate 5. A pusher 13, fitted in the recess 7, is acted upon by a stack of elastic washers 14. The latter press on a roller bearing 15 supported on an annular shoulder of the cylinder head 6. The pusher 13 is integral with a rod 16 which is continued toward the bottom by a shaft element 17 coupled by a telescopic coupling to the shaft 18 of the motor 9. The socket 19 hugs the shaft 17 and can rotate with it in the thrust bearing 15.

Finally, an interposed part 20 is provided between the pusher 13 and the distributor body 10. This interposed part, of insulating material, maintains a certain distance between the pusher and the distributor body and avoids the wastes of heat which might otherwise disturb both the functions of the elastic elements 14 and the passage of the plastic material in the distributor. It further ensures the coupling between the pusher 13 and the distributor body owing to the shape of its contour, fitted to the recesses contrived in the respective faces of pusher 13 and body 10.

The function of the motor 9, which might be a reducer motor, or a stepping motor, is to communicate rotational movements to the distributor body 10 about the axis 3. As is seen in FIG. 1, the distributor body has a tiered shape. Its upper portion has a narrow diameter equal to that of the disk 5, whereas its lower portion forms a flange. This flange is interrupted over an arc of a circle corresponding to the maximum amplitude of the possible movements of the distributor body, and a pin 21 driven into the rear face of the cylinder 1 limits the angular displacements of the distributor body.

The cylinder 1 further comprises, at the height of the portion of the narrow diameter of the recess 2, an elongated opening 22, so that a coupling 23 screwed into a tapped hole contrived in the cylindrical face of the body 10 can move with the latter within the arcuate aperture 22 formed in the distributor cylinder 1 when the distributor is controlled. The slightly frustoconical bore 24 of the coupling 23 communicates with an inner conduit 25 perpendicular to the axis 3 contrived in the body 10.

This conduit 25 itself communicates at two diametrically opposed points through axial segments 26 with the face 11 of the body 10.

This face 11 further comprises two connection zones in the form of arcuate grooves, having an extension on the order of 90° and designated as 27 and 271 in FIG. 1, these grooves being intended to communicate with four axial conduits contrived in the cylinder 1 and through the wear plate 5, so as to present mouths in the contact face 12.

For understanding the arrangement of the intake and outlet conduits 28 and 29, 281 and 291, and of the mouths, reference will be made to FIG. 2, where there are seen, diagrammatically represented, two intake conduits 28 and 281, two outlet conduits 29 and 291, as well as the mouths 30 and 31 of the conduits 28 and 29 and the mouths 300 and 301 of the conduits 281 and 291. The contact surface 11 of the body 10, with the arcuate grooves 27 and 271, is likewise depicted in that figure. It is seen that in the position depicted, the intake conduit 28 ($I_2$) communicates via the connection zone 27 with the outlet conduit 29 ($O_2$), while the intake conduit 281 ($I_1$) communicates via the connection groove 271 with the outlet conduit 291 ($O_1$). It will be realized that if, starting from the position of FIG. 2, the body 10 effects a clockwise rotary movement, through an angle of 90°, the intake conduit 281 will be made to communicate, via the groove 27, with the outlet conduit 29, while the intake conduit 28 will be made to communicate, via the connection groove 271, with the outlet conduit 291.

Figure 2:
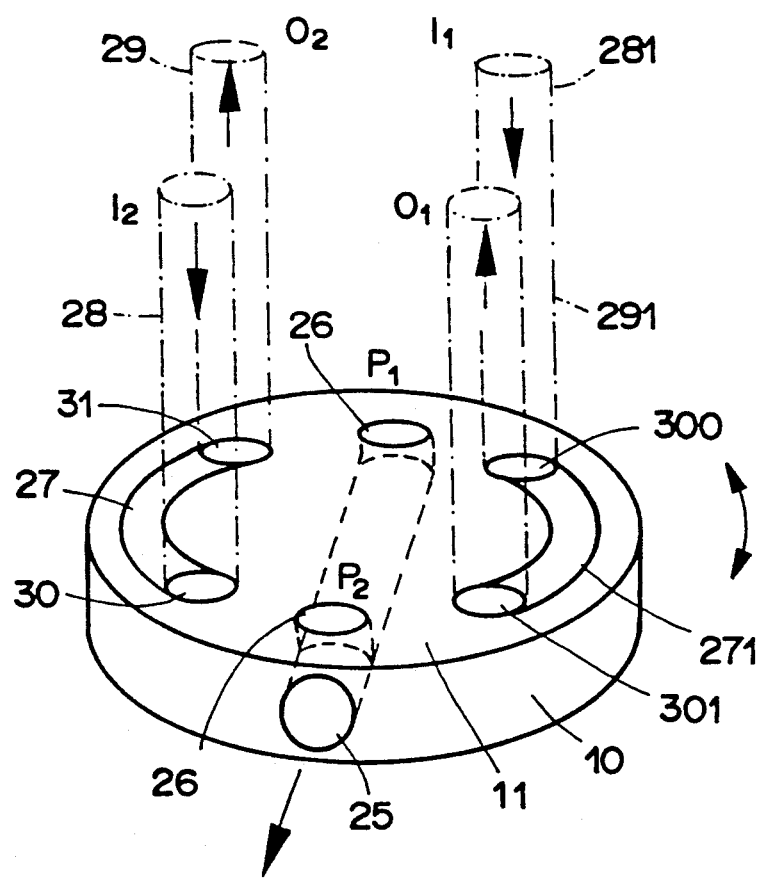
FIG. 2 is a simplified diagrammatic perspective view illustrating the operation of the device of FIG. 1.
Figure 3:
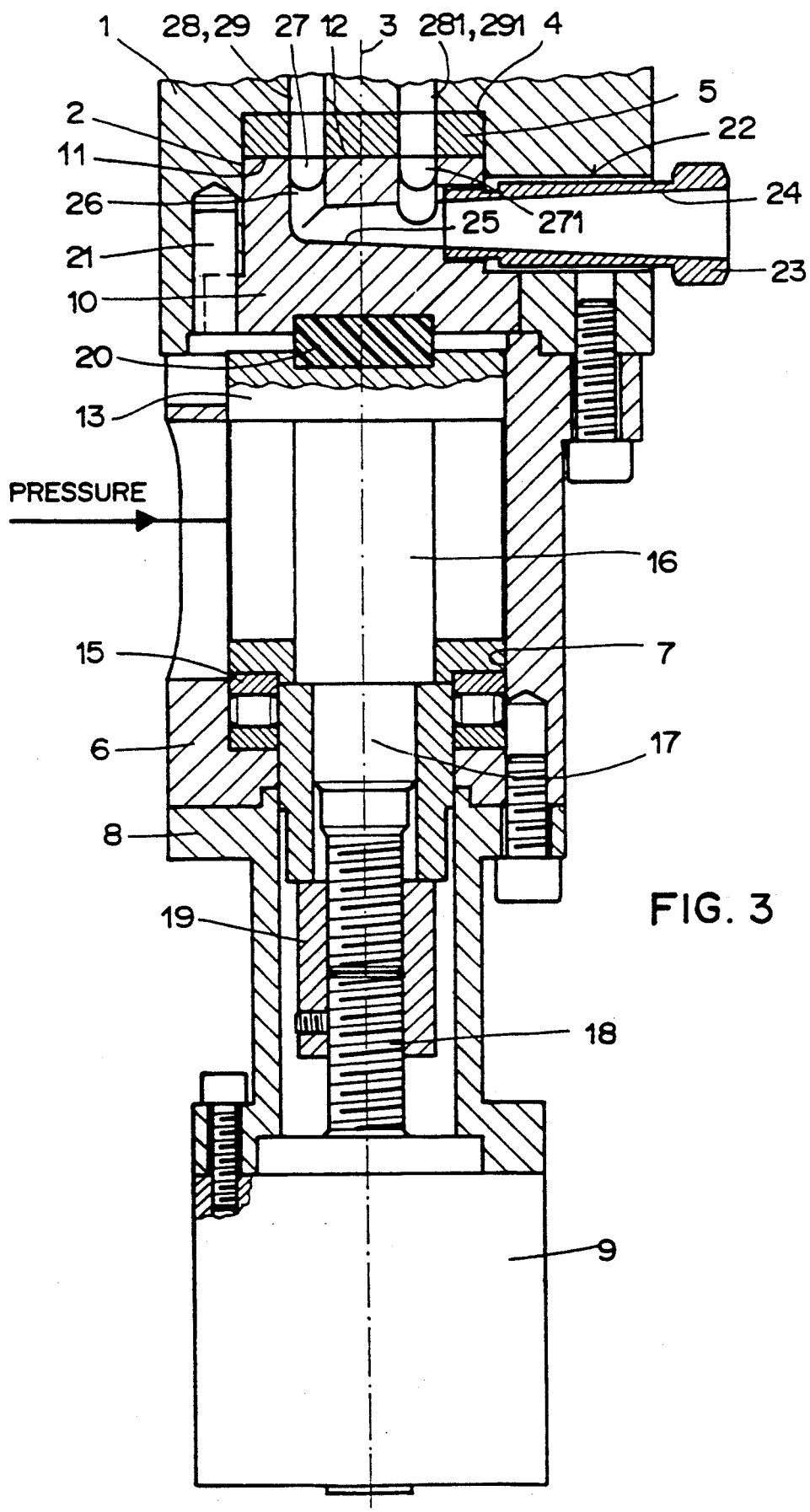
Figure 4:
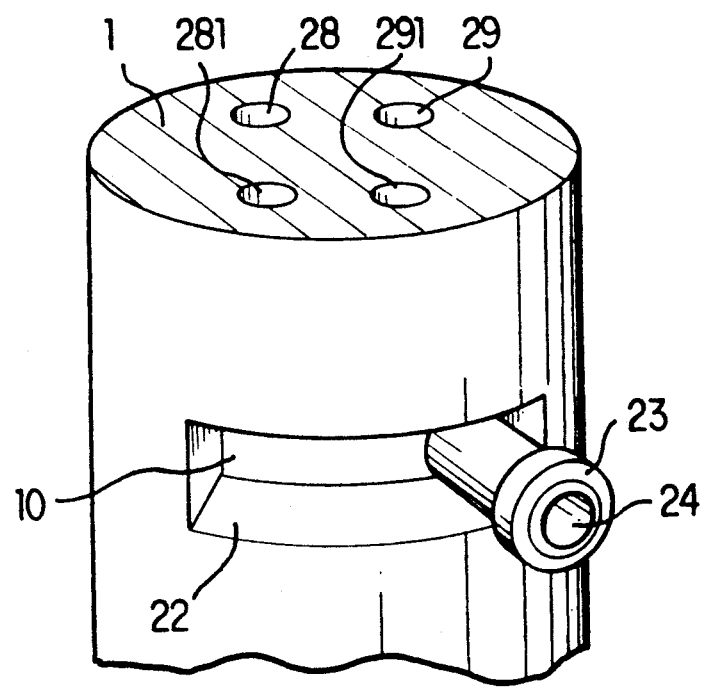
FIG. 4 is a perspective view of the outside of the distributor cylinder.

The drain duct 25 is then oriented at 90° from the position which it occupies in FIG. 2, and consequently, its mouths are likewise stopped. On the other hand, if the previously described rotary movement is interrupted midway, one of the conduit segments 26 is in communication with the mouth 300, while the other is in communication with the mouth 30, and consequently, the two intake conduits 28 and 281 are connected to the drain.

The design described permits varied communications to be established between the different intake and outlet conduits of the cylinder 1. A distributor of this kind may be incorporated, for example, in an extrusion line capable of producing an insulated electric wire, the insulating sheath of which comprises a colored surface film, and the color of which is capable of being changed instantly from a first value to a second value and vice versa. For that purpose, the distributor body comprises two connection grooves, and the distributor cylinder comprises two intake conduits and two outlet conduits.

However, it is possible to conceive of other, more sophisticated embodiments of a distributor, comprising a larger of intake and outlet conduits not necessarily being the same. One skilled in the art will be capable, on the basis of the example described, of designing distributors corresponding to more complicated requirements than those satisfied by the device described.

It will be noted that the use of the stack of elastic washers 14 permits ensuring a relatively high pressure of the distributor body against the contact face 12 of the wear part 5. The use of an extensible coupling shaft between the motor 9 and the pusher rod 16 permits taking into account the elasticity of the washers, as well as the possible wear of the surface 12.

However, there might equally be provided, in lieu of the elements 14, a hydraulic system 30 acting upon the rear face of the pusher 13. In this case, the value of the pressure acting upon this pusher might be modified. The rotary movements of the distributor body could then be effected without this body's being under pressure, so that wear and tear would be reduced.

The assembly formed by the pressure means, the rotary drive means, and the distributor body is mounted rotatingly and rotates with minimum resistance to friction owing to the arrangement of the roller bearing 15. This bearing ensures the reliability of the distributor from the point of view of wear and tear and of operating dependability at high temperatures. As may be seen in the drawing, the cylinder head 6 can be largely hollowed out to keep the motor and the elastic washers at a suitable temperature. The part 20 performs an insulating function which avoids heat losses.

What is claimed is:

1. A distributor for distributing a flow of liquid material under conditions of high temperature and high pressure, comprising:
   a distributor cylinder;
   at least one intake duct and at least one outlet duct provided in the distributor cylinder, wherein the distributor cylinder has an inside surface, said at least one intake duct and said at least one outlet duct each having one end opening to the inside surface;
   a cylindrical distributor body rotatable about an axis of the distributor cylinder, having at least one distributor duct, each at least one distributor duct able to selectively connect one of said at least one intake duct with one of said at least one outlet duct;
   pressure means rotatably movable with said distributor body for pressing the distributor body against the inside surface of the distributor cylinder to counteract a pressure of the liquid material against the distributor body; and
   drive means for rotating the distributor body about the axis, comprising a motor having a rotor coaxial with said distributor cylinder and an extensible connection means disposed between said rotor and said distributor body.

2. The distributor of claim 1, further comprising a thrust bearing and a support element integral with said connection means for rotation therewith, said pressure means being disposed about said connection means and resting at one end against said thrust bearing and at the other end against said support element.

3. The distributor of claim 2, wherein said distributor body and said support element each include a recess, said pressure means and said drive means jointly comprising a rigid part of non-circular contour made of a thermally insulating material and fitted in each said recess for keeping said distributor body and said support element spaced from one another.

4. The distributor of claim 1, wherein said pressure means comprise a stack of elastic washers.

5. The distributor of claim 1, wherein said pressure means comprise a piston subjected to the action of a fluid.

6. The distributor of claim 1, further comprising an interposed part between said drive means and said distributor body, said interposed part formed of an insulating material and able to maintain a distance and ensure a coupling between said drive means and said distributor body.

7. The distributor of claim 1, wherein the liquid material is a molten plastic material.

8. A distributor for distributing a flow of liquid material under conditions of high pressure and high temperature, comprising:
- a distribution cylinder;
- a plurality of intake ducts and a plurality of outlet ducts provided in the distribution cylinder, one opening of each intake duct and of each outlet duct provided on an inside surface of a bottom of the distribution cylinder;
- a cylindrical distribution body disposed in the distribution cylinder including a contact surface having at least one aperture;
- a drain conduit included within the mass of said distributor body and communicating with said contact surface through one of said at least one aperture;
- a plurality of distribution ducts completely contained within the distribution body, each of the plurality of distribution ducts able to connect one of the plurality of intake ducts to one of the plurality of outlet ducts; and
- drive means for rotating the distribution body about an axis, wherein the plurality of distribution ducts are arranged so that differing ones of the plurality of intake ducts are connected to differing ones of the plurality of outlet ducts depending on the angular position of the distribution body relative to the distribution cylinder.

9. The distributor of claim 8, further comprising a coupling borne by said distributor body, protruding outwardly said distributor cylinder, and communicating with said drain conduit.

10. The distributor of claim 9, wherein the wall of said distributor cylinder includes an arcuate aperture, said coupling passing through said aperture for rotation with said distributor body through an angle sufficient to ensure communication between said intake ducts and said outlet ducts.

11. A distributor for distributing a flow of liquid material under conditions of high temperature and high pressure, comprising:
- a distributor cylinder;
- at least one intake duct and at least one outlet duct provided in the distributor cylinder, wherein the distributor cylinder has an inside surface, said at least one intake duct and said at least one outlet duct each having one end opening to the inside surface;
- a cylindrical distributor body rotatable about an axis of the distributor cylinder, having at least one distributor duct, each at least one distributor duct able to selectively connect one of said at least one intake duct with one of said at least one outlet duct;
- a wear plate disposed in said distributor cylinder, a surface of said wear plate facing said distributor body to form a contact surface of said distributor cylinder;
- pressure means rotatably movable with said distributor body for pressing the distributor body against the inside surface of the distributor cylinder to counteract a pressure of the liquid material against the distributor body; and
- a drive means for rotating the distributor body about the axis.

12. A distributor for distributing a flow of liquid material under conditions of high pressure and high temperature, comprising:
- a distribution cylinder;
- a plurality of intake ducts and a plurality of outlet ducts provided in the distribution cylinder, one opening of each intake duct and of each outlet duct provided on an inside surface of a bottom of the distribution cylinder;
- a cylindrical distribution body disposed in the distribution cylinder;
- a plurality of distribution ducts completely contained within the distribution body, each of the plurality of distribution ducts able to connect one of the plurality of intake ducts to one of the plurality of outlet ducts; and
- drive means for rotating the distribution body about an axis, wherein the drive means comprise a motor having a rotor coaxial with said distributor cylinder and an extensible connection means disposed between said rotor and said distributor body and the plurality of distribution ducts are arranged so that differing ones of the plurality of intake ducts are connected to differing ones of the plurality of outlet ducts depending on the angular position of the distribution body relative to the distribution cylinder.

13. The distributor of claim 12, wherein said distributor body includes a frontal surface, said distribution ducts taking the form of arcuate hollows contrived in said frontal surface.

14. The distributor of claim 12, wherein the liquid material is a molten plastic material.

15. The distributor of claim 12, wherein at least two of the plurality of the distribution ducts simultaneously each connect one of the plurality of inlet ducts to one of the plurality of outlet ducts.

* * * * *